(12) United States Patent
Kurtenbach et al.

(10) Patent No.: US 7,986,318 B2
(45) Date of Patent: Jul. 26, 2011

(54) VOLUME MANAGEMENT SYSTEM FOR VOLUMETRIC DISPLAYS

(75) Inventors: Gordon Paul Kurtenbach, Toronto (CA); George William Fitzmaurice, Toronto (CA); Ravin Balakrishnan, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 11/345,452

(22) Filed: Feb. 2, 2006

(65) Prior Publication Data

US 2006/0125822 A1    Jun. 15, 2006

Related U.S. Application Data

(63) Continuation of application No. 10/183,966, filed on Jun. 28, 2002, now Pat. No. 7,839,400.

(51) Int. Cl.
*G06T 15/00* (2006.01)
(52) U.S. Cl. ............ 345/419; 345/6; 345/156; 345/619; 345/632; 345/633; 348/40; 348/42
(58) Field of Classification Search .................... 348/42; 600/443
See application file for complete search history.

(56) References Cited

U.S. PATENT DOCUMENTS

| | | | |
|---|---|---|---|
| 4,134,104 A | 1/1979 | Karras | |
| 4,160,973 A | 7/1979 | Berlin, Jr. | |
| 5,134,390 A | 7/1992 | Kishimoto et al. | |
| 5,241,656 A * | 8/1993 | Loucks et al. | 715/794 |
| 5,548,694 A * | 8/1996 | Frisken Gibson | 345/424 |
| 5,678,015 A | 10/1997 | Goh | |
| 5,717,415 A | 2/1998 | Iue et al. | |
| 5,754,809 A * | 5/1998 | Gandre | 715/782 |
| 5,767,854 A | 6/1998 | Anwar | |
| 5,801,704 A * | 9/1998 | Oohara et al. | 715/856 |
| 5,805,137 A * | 9/1998 | Yasutake | 345/156 |
| 5,835,091 A * | 11/1998 | Bailey et al. | 715/854 |
| 5,854,449 A | 12/1998 | Adkins | |
| 5,861,583 A | 1/1999 | Schediwy et al. | |
| 5,880,733 A * | 3/1999 | Horvitz et al. | 715/850 |
| 5,898,433 A | 4/1999 | Hijikata | |
| 5,905,492 A * | 5/1999 | Straub et al. | 715/744 |
| 5,959,614 A | 9/1999 | Ho | |
| 6,008,800 A | 12/1999 | Pryor | |

(Continued)

OTHER PUBLICATIONS

Clifton et al. Cutting Planes and Beyond. Computers & Graphics. vol. 21. No. 5. 1997.*

(Continued)

*Primary Examiner* — Xiao M Wu
*Assistant Examiner* — Phi Hoang
(74) *Attorney, Agent, or Firm* — Staas & Halsey LLP

(57) ABSTRACT

The present invention is a system that manages a volumetric display using volume windows. The volume windows have the typical functions, such as minimize, resize, etc., which operate in a volume. When initiated by an application a volume window is assigned to the application in a volume window data structure. Application data produced by the application is assigned to the windows responsive to which applications are assigned to which windows in the volume window data structure. Input events are assigned to the windows responsive to whether they are spatial or non-spatial. Spatial events are assigned to the window surrounding the event or cursor where a policy resolves situations where more than one window surrounds the cursor. Non-spatial events are assigned to the active or working window.

27 Claims, 11 Drawing Sheets

U.S. PATENT DOCUMENTS

| | | | |
|---|---|---|---|
| 6,008,809 A | 12/1999 | Brooks | |
| 6,031,519 A * | 2/2000 | O'Brien | 345/156 |
| 6,031,541 A * | 2/2000 | Lipscomb et al. | 345/420 |
| 6,043,818 A * | 3/2000 | Nakano et al. | 715/851 |
| 6,049,317 A | 4/2000 | Thompson et al. | |
| 6,052,100 A | 4/2000 | Soltan et al. | |
| 6,064,423 A * | 5/2000 | Geng | 348/36 |
| 6,069,594 A | 5/2000 | Barnes et al. | |
| 6,100,862 A | 8/2000 | Sullivan | |
| 6,115,028 A | 9/2000 | Balakrishnan et al. | |
| 6,152,563 A | 11/2000 | Hutchinson et al. | |
| 6,186,949 B1 * | 2/2001 | Hatfield et al. | 600/443 |
| 6,208,318 B1 * | 3/2001 | Anderson et al. | 345/1.1 |
| 6,211,848 B1 * | 4/2001 | Plesniak et al. | 345/156 |
| 6,229,542 B1 | 5/2001 | Miller | |
| 6,271,847 B1 | 8/2001 | Shum et al. | |
| 6,421,048 B1 * | 7/2002 | Shih et al. | 345/419 |
| 6,512,498 B1 | 1/2003 | Favalora et al. | |
| 6,575,596 B2 | 6/2003 | Butt | |
| 6,577,330 B1 | 6/2003 | Tsuda et al. | |
| 6,597,358 B2 * | 7/2003 | Miller | 345/427 |
| 6,628,298 B1 | 9/2003 | Debevec | |
| 6,629,065 B1 * | 9/2003 | Gadh et al. | 703/1 |
| 6,697,034 B2 | 2/2004 | Tashman | |
| 6,710,788 B1 * | 3/2004 | Freach et al. | 715/778 |
| 6,753,847 B2 * | 6/2004 | Kurtenbach et al. | 345/156 |
| 6,765,566 B1 * | 7/2004 | Tsao | 345/419 |
| 6,774,914 B1 * | 8/2004 | Benayoun | 345/650 |
| 6,792,398 B1 * | 9/2004 | Handley et al. | 703/2 |
| 6,842,175 B1 | 1/2005 | Schmalstieg et al. | |
| 6,954,218 B2 * | 10/2005 | Stall | 345/654 |
| 7,567,701 B2 * | 7/2009 | Fontius | 382/154 |
| 7,701,455 B2 * | 4/2010 | Tsao | 345/419 |
| 2001/0028369 A1 * | 10/2001 | Gallo et al. | 345/848 |
| 2002/0008676 A1 * | 1/2002 | Miyazaki et al. | 345/6 |
| 2002/0033849 A1 | 3/2002 | Loppini et al. | |
| 2002/0041327 A1 * | 4/2002 | Hildreth et al. | 348/42 |
| 2002/0085020 A1 * | 7/2002 | Carroll, Jr. | 345/700 |
| 2002/0135539 A1 | 9/2002 | Blundell | |
| 2002/0163482 A1 * | 11/2002 | Sullivan | 345/6 |
| 2003/0142136 A1 | 7/2003 | Carter et al. | |
| 2005/0062684 A1 | 3/2005 | Geng | |

OTHER PUBLICATIONS

Meyer et al. Direct Manipulation of Isosurfaces and Cutting Planes in Virtual Environments. Technical Report: CS-93-54. 1993.*

100-million-voxel volumetric display, Favalora, G E; Napoli, J; Hall, D M; Dorval, R K; Giovinco, M; Richmond, M J; Chun, W S, Proceedings of SPIE, the International Society for Optical Engineering Proceedings of SPIE, the International Society for Optical Engineering, 2002.*

Balakrishnan, R.; Fitzmaurice, G.W.; Kurtenbach, G.; , "User interfaces for volumetric displays," Computer , vol. 34, No. 3, pp. 37-45, Mar 2001.*

W. Buxton and G.W. Fitzmaurice, "HMD's, Caves, and Chameleon: A Human-Centric Analysis of Interaction in Virtual Space," Computer Graphics, vol. 32, No. 4, 1998, pp. 64-68.

M. Czernuszenko et al., "The ImmersaDesk and Infinity Wall Projection-Based Virtual Reality Displays," Computer Graphics, vol. 31, No. 2, 1997, pp. 46-49.

D. Ebert et al., "Realizing 3D Visualization using Crossed-Beam Volumetric Displays," Comm. ACM, vol. 42, No. 8, 1999, pp. 101-107.

M. Lucente, "Interactive Three-Dimensional Holographic Displays: Seeing the Future in Depth," Computer Graphics, May 1997, pp. 63-67.

M. Sinclair, "The Haptic Lens," Proc. Siggraph 97, ACM Press, New York, 1997, p. 179.

T. Murakami and N. Nakajima, "Direct and Intuitive Input Device for 3D Shape Deformation," Proc. Computer- Human Interaction (CHI 94), ACM Press, New York, 1994, pp. 465-470.

R. Balakrishnan et al., "The Rockin'Mouse: Integral 3D Manipulation on a Plane," Proc. Computer-Human Interaction (CHI 97), ACM Press, New York, 1997, pp. 311-318.

G. Fitzmaurice, H. Ishii, and W. Buxton, "Bricks: Laying the Foundations for Graspable User Interfaces," Proc. Computer-Human Interaction (CHI 95), ACM Press, New York, 1995, pp. 442-449.

S. Zhai, W. Buxton, and P. Milgram, "The 'Silk Cursor': Investigating Transparency for 3D Target Acquisition," Proc. Computer-Human Interaction (CHI 94), ACM Press, New York, 1994, pp. 459-464.

B. Conner et al., "Three Dimensional Widgets," Computer Graphics, vol. 22, No. 4, 1992, pp. 121-129.

G. Fitzmaurice et al., "An Exploration into Supporting Artwork Orientation in the User Interface," Proc. Computer-Human Interaction (CHI 99), ACM Press, New York, 1999, pp. 167-174.

Ken-ichi Kameyama, et al.,"Virtual Surgical Operation System Using Volume Scanning Display", Image Capture, Formatting, and Display, SPIE, vol. 2164, Medical Imaging 1994, pp. 146-154.

Michael Halle, "Autostereoscopic Displays and Computer Graphics", Computer Graphics, ACM SIGGRAPH, 31(2), May 1997, pp. 58-62.

Gregg Favalora et al., "Volumetric Three-Dimensional Display System with Rasterization Hardware", SPIE, vol. 4297A, Feb. 2001.

E. Sachs, A. Roberts and D. Stoops, "3-Draw: A Tool for the Conceptual Design of Three Dimensional Shape", IEEE Computer Graphics and Applications, Jan. 1990.

K. Kameyama and K. Ohtomi, "A Direct 3-D Shape Modeling System", IEEE, pp. 519-524.

J. Viega et al., "3D Magic Lenses", UIST 1996, Seattle, Washington, pp. 51-58.

K. Kameyama, K. Ohtomi and Y. Fukui, "Interactive Volume Scanning 3-D Display with an Optical Relay System and Multidimensional Input Devices", SPIE vol. 1915 Stereoscopic Displays and Applications IV (1993), pp. 12-20.

K. Kameyama and K. Ohtomi, "A Shape Modeling System with a Volume Scanning Display and Multisensory Input Device", Presence: vol. 2, No. 2, 1993, pp. 104-111.

K. Kameyama and K. Ohtomi, "VR System Using Volume Scanning Display and Multi-Dimensional Input Device", ISMCR, Nov. 1992, pp. 473-479.

K. Kameyama, K. Ohtomi and Yukio Fukui, "A Virtual Reality System Using a Volume Scanning 3D Display", 1991.

PCT International Search Report, PCT/US03/02341, filed Jan. 27, 2003, mailed Aug. 8, 2003.

Written Opinion, PCT IPEA, Dec. 11, 2003, 6 pp.

U.S. Appl. No. 10/183,970, filed Jun. 28, 2002, Kurtenbach, et al., Silicon Graphics, Inc.

U.S. Appl. No. 10/183,945, filed Jun. 28, 2002, Fitzmaurice, et al., Silicon Graphics, Inc.

U.S. Appl. No. 10/183,968, filed Jun. 28, 2002, Fitzmaurice, et al., Silicon Graphics, Inc.

U.S. Appl. No. 10/188,765, filed Jun. 28, 2002, Balakrishnan, et al., Silicon Graphics, Inc.

U.S. Appl. No. 10/183,944, filed Jun. 28, 2002, Balakrishnan, et al., Silicon Graphics, Inc.

R. Balakrishnan et al., "User Interfaces for Volumetric Displays", Mar. 2001, IEEE Computer Society Press, vol. 34, Issue 3, pp. 37-45.

"A User Interface to a True 3-D Display Device", Hobbs et al., Proceedings of 5th Int'l Conference on Human-Computer Interaction, Aug. 1993, pp. 579-584.

"Multi-Finger Gestural Interaction with 3D Volumetric Displays", Grossman et al., UIST, ACM 2004, Oct. 2004, pp. 61-70.

"Actuality Systems—Spatial 3D", URL http://www.actuality-systems.com/index.php/actuality/layout/set/print.

"Spatial 3D: The End of a Flat Screen Thinking", Gregg Favlora and Cameron Lewis, Actuality Systems, Inc., Jul. 2003, First in a Series of Three Papers, pp. 1-6.

Office Action mailed Feb. 4, 2009 in U.S. Appl. No. 10/183,966.

Office Action mailed Jun. 9, 2008 in U.S. Appl. No. 10/183,966.

Final Office Action mailed Nov. 1, 2007 in U.S. Appl. No. 10/183,966.

Office Action mailed Jul. 10, 2007 in U.S. Appl. No. 10/183,966.

Office Action mailed Mar. 13, 2006 in U.S. Appl. No. 10/183,966.

Final Office Action mailed Nov. 2, 2005 in U.S. Appl. No. 10/183,966.

Office Action mailed Oct. 18, 2004 in U.S. Appl. No. 10/183,966.
Office Action mailed Jun. 1, 2004 in U.S. Appl. No. 10/183,966.
Notice of Allowance and Fee Transmittal issued in parent U.S. Appl. No. 10/183,966 dated Jul. 29, 2010.
U.S. Appl. No. 10/183,966, filed Jun. 28, 2002, Gordon Paul Kurtenbach.

Office Action mailed Oct. 5, 2009 in U.S. Appl. No. 10/183,966.
Examiner Interview Summary Record mailed Oct. 5, 2009 in U.S. Appl. No. 10/183,966.

* cited by examiner

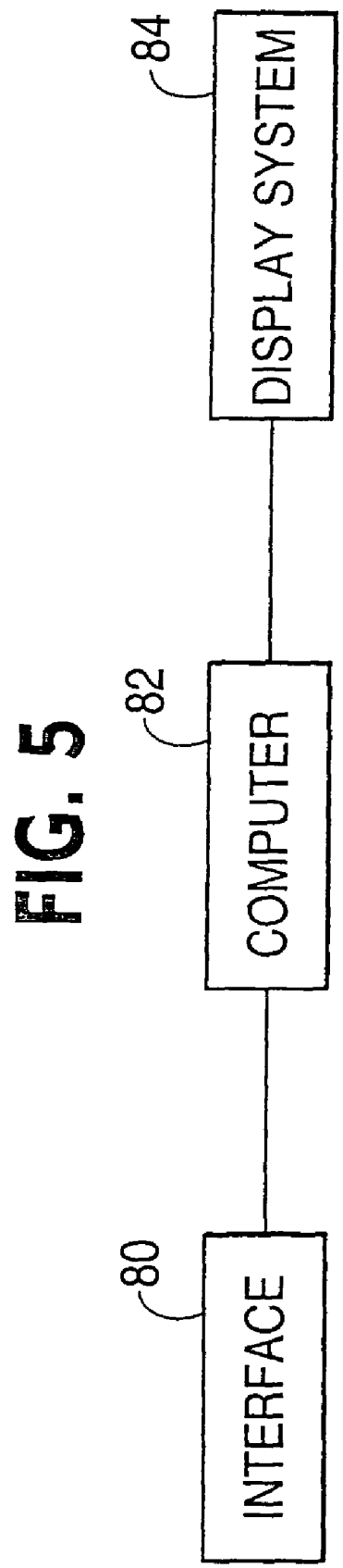

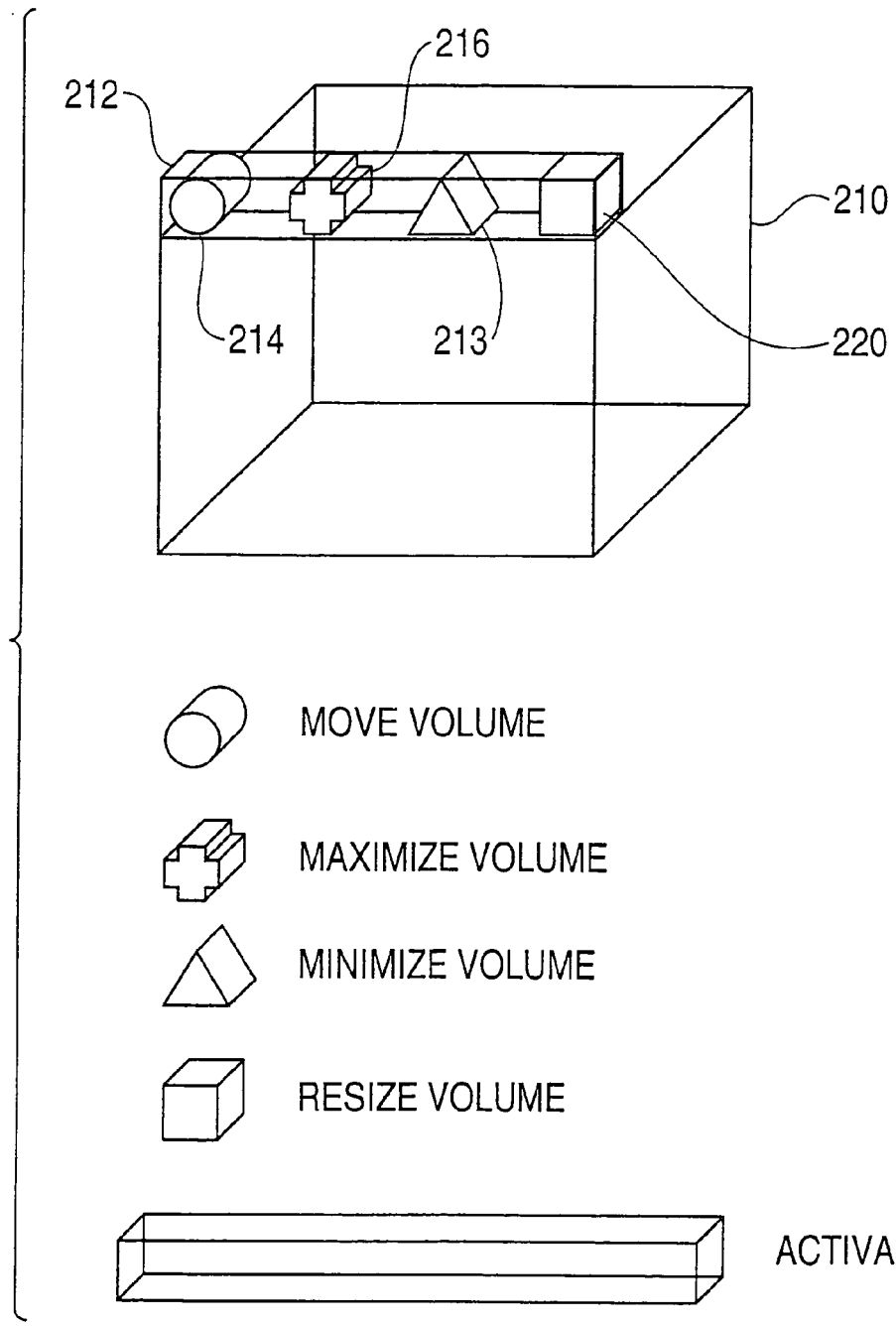

VOLUME MANAGEMENT SYSTEM FOR VOLUMETRIC DISPLAYS

CROSS-REFERENCE TO RELATED APPLICATION(S)

This application is a Continuation of U.S. patent application Ser. No. 10/183,966 filed Jun. 28, 2002 now U.S. Pat. No. 7,839,400. This application is related to and claims priority to U.S. provisional application entitled User Interfaces For Volumetric Displays, having Ser. No. 60/350,952, by Kurtenbach et al, filed Jan. 25, 2002, this application is also related to U.S. Pat. No. 6,753,847 entitled Three Dimensional Volumetric Display Input And Output Configurations, by Kurtenbach et al, to U.S. application entitled Widgets Displayed And Operable On A Surface Of A Volumetric Display Enclosure, having Ser. No. 10/183,945 by Fitzmaurice et al, filed concurrently herewith, to U.S. Pat. No. 7,205,991, entitled Graphical User Interface Widgets Viewable And Readable From Multiple Viewpoints In A Volumetric Display, by Fitzmaurice et al, to U.S. Pat. No. 7,138,997, entitled A System For Physical Rotation of Volumetric Display Enclosures To Facilitate Viewing, by Balakrishnan et al, and to U.S. application entitled Techniques For Pointing To Locations Within A Volumetric Display, having Ser. No. 10/183,944, by Balakrishnan et al, filed concurrently herewith, and all of which are incorporated by reference herein.

BACKGROUND OF THE INVENTION

1. Field of the Invention

The present invention is directed to a system for managing data within a volumetric display and, more particularly, to a system that uses volume windows to manage data within a volumetric display.

2. Description of the Related Art

A class of three-dimensional (3D) displays, called volumetric displays, is currently undergoing rapid advancement. The types of displays in this class include holographic displays, swept volume displays and static volume displays. Volumetric displays allow for three-dimensional (3D) graphical scenes to be displayed within a true 3D volume. Such displays can take many shapes including cylinders, globes, domes, cubes, etc. with a dome being a typical shape. Because the technology of these displays is undergoing rapid development those of skill in the art are concentrating on the engineering of the display itself. As a result, the man-machine interface to or input/output configurations with which people interface with these types of displays is receiving scant attention.

While the volumetric displays allow a user to view different parts of a true 3D scene, the act of viewing the different parts typically requires that the user physically move around (or over) the display or that the display be moved or rotated in front of the user. As the display moves relative to the user, graphical objects may also move relative to the user. When the display is relatively stationary or when it is relatively moving, the user may need to interact with the display. Because users will interact with these displays in unexpected ways, like conventional 2D displays, 3D volumetric displays require mechanisms for the general management and placement of data within these types of displays. What is needed is a system for managing the volume(s) in a volumetric display.

SUMMARY OF THE INVENTION

It is an aspect of the present invention to provide a system that manages data within a volumetric display using volume windows.

It is another aspect of the present invention to allow users to use simple and familiar modes of operation in operating with volume windows.

It is also an aspect of the present invention to provide functions that support operations on volume windows.

The above aspects can be attained by a system that manages a volumetric display using volume windows within a display space or main volume window or root volume. The volume windows have the typical functions, such as minimize, resize, etc, that operate in a volume. Application data, such as a surface texture of a model, is assigned to the windows responsive to which applications are assigned to which windows in a volume window data structure. Input events, such as a mouse click, are assigned to the windows responsive to whether they are spatial or non-spatial. Spatial events are assigned to the window surrounding the event and non-spatial events are assigned to the active or working window or to the root.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 depicts the components of the present invention.

FIG. 13 illustrates volume window controls.

DETAILED DESCRIPTION OF THE PREFERRED EMBODIMENTS

Figure 1:
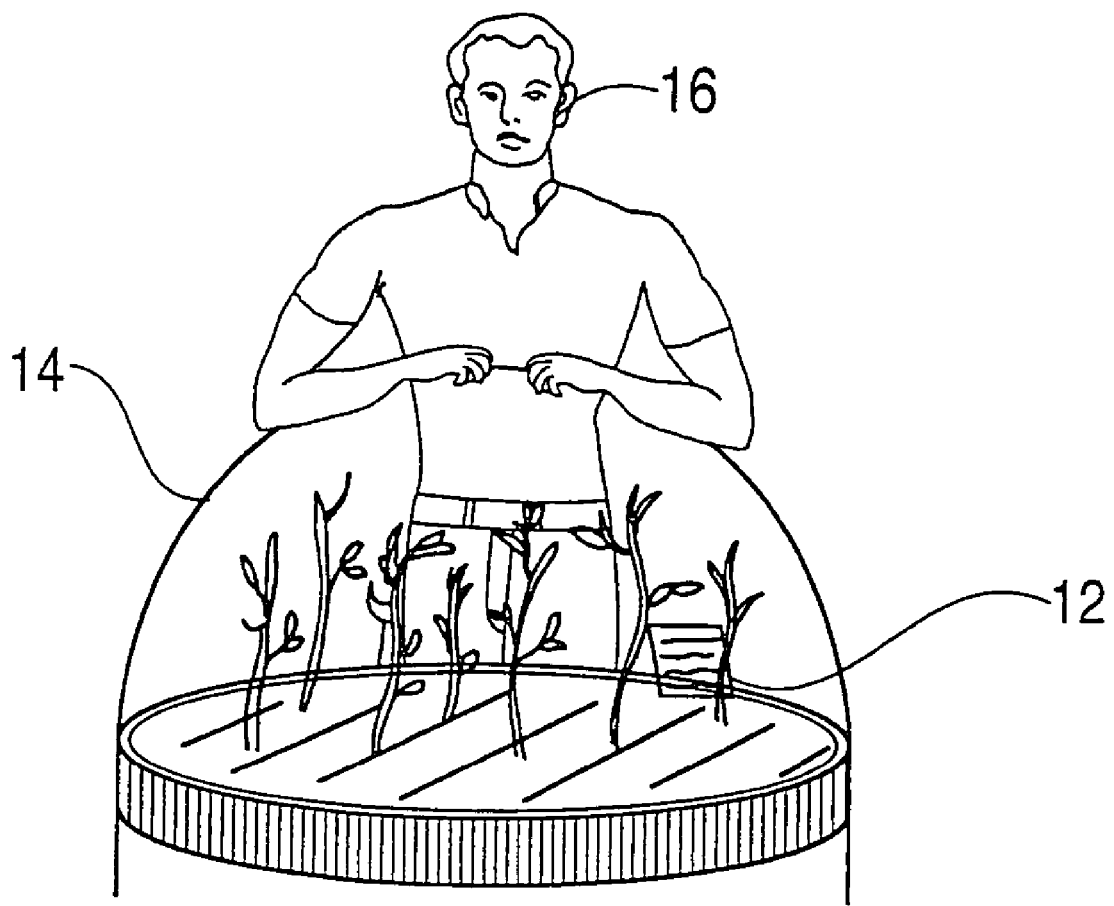
FIG. 1 depicts a volumetric display.

Volumetric displays allow a user to have a true three-dimensional (3D) view of a 3D scene 12 and are typically provided in the form of a dome 14, as depicted in FIG. 1. The user 16, as can be surmised from FIG. 1, can move about the dome 14 to view different parts of the scene 12. From a particular arbitrary viewpoint or position, a user may want to interact with one or more regions within or scenes/content within the volumetric display.

There are a number of different solutions to this problem. These solutions involve creating volume windows (VW) within the volumetric display or display space and allowing a user to manipulate these volume windows. A volume window is a volume region within the volumetric display delimited from other parts/regions (or volumes) of the volumetric display by 3D bounding boxes or 3D boundaries to allow users and the system to distinguish between the windows. The volumetric window boundaries can be delineated in a number of ways. For example, each VW can (1) have a wireframe border along the edges of the volume, (2) the wireframe itself could have a thickness as in a "bezeled" edge, (3) the background color within the volume can be a different color than the empty space within the 3D display (4) the "floor" of the VW can be a solid color or pattern with the "roof" of the VW outlined in a wireframe or a solid pattern. The display and management system preferably will allow visibility of a volume from any viewpoint.

However, some cases may necessitate that only part of a volumetric window is viewable based on where the user is positioned around the volumetric display. For example, suppose a volumetric display has a VW in the shape of a cube. One face of a VW could be "open" while the sides of the remaining faces of the cube appear opaque. Thus, the contents of the VW are only visible when the user can see the "open" side of the VW.

Volume windows can be active or inactive. This allows the system, for example, to direct input events to a target (active) volume window when multiple VWs are available. A portion of the active volume window is preferably "highlighted" to differentiate it among the other VWs. For example, the border bezel or titlebar of an active volume window may turn a brighter/darker color compared to the other VWs.

The solutions also provide mechanisms for general management of the placement of the volumes within the display and the data within the volumes. The user is allowed to define volumes, delineate sub-portions of a working volume, divide the working volume into sub-volumes, move volumes within the display, compact or compress volumes, establish relationships between volumes. For example parent and sibling volumes can be defined such that when an act is performed on the parent, the siblings react. As another example, if a parent VW is closed, all of the sibling VWs are also closed. Another example has a sibling VW attached to the border of a parent VW. When the parent VW moves, so does the sibling VW, etc. The solutions include extending basic operations of 2D window managers, such as drag/drop to operate with volumetric user interfaces.

Figure 2:
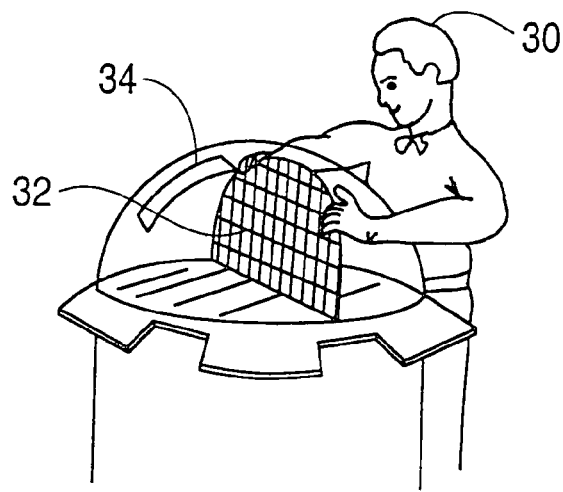
FIG. 2 shows a user managing the volume with a gesture-controlled plane.
Figure 3A:
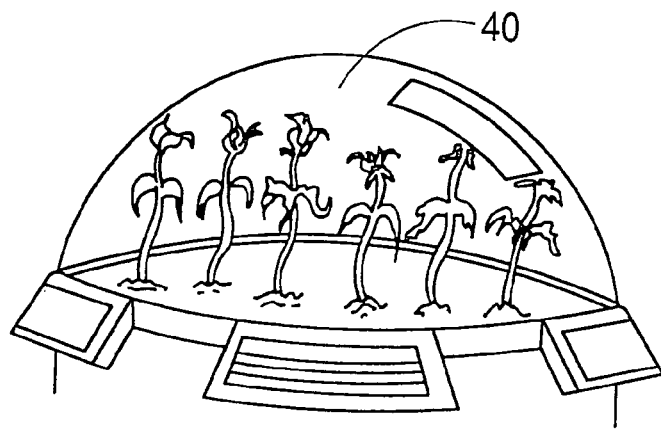
FIGS. 3a and 3b illustrate volume management through space compression.
Figure 3B:
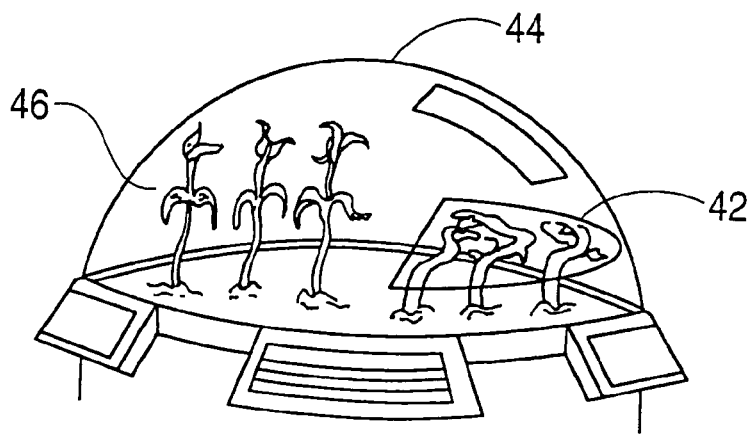

The solutions also allow users to interact with the volumes (or display space). The users can use gestures to delineate sub-portions of the working volume. FIG. 2 shows a user 30 using gestures to specify an operational plane 32 within the volume 34, and, if the command associated with the plane is "divide volume", it can be to divide the volume into two sub-volumes or volume windows. In this gesture operation the positions of the hands are sensed using a touch sensitive surface of the display 34 or a 3D position sensing system and a virtual plane is created between the conduct points. A more specialized use is to create more space within the working volume, either by compacting objects within the space or by moving objects out the way. For example, a gesture can be given to "crush" the 3D scene 40 along a specific horizontal plane 42 (see FIGS. 3a and 3b). Here, the main elements of the scene 40 would be still visible along the floor of the dome display 44 to provide context while allowing manipulation access to objects 46 along the "back" of the scene. When a 2D window is iconified and put on the "task bar" this could be considered an extreme "crush" action. A volume window can be iconified in the same way. Alternatively, another style of 2D window management can be employed where the volumes are a tiled instead of overlapping or cascaded. Here, the full screen is used whenever possible and growing one edge of a volume window shrinks the adjoining window by the same amount. Windows never overlap in this tiling situation.

Figure 4A:
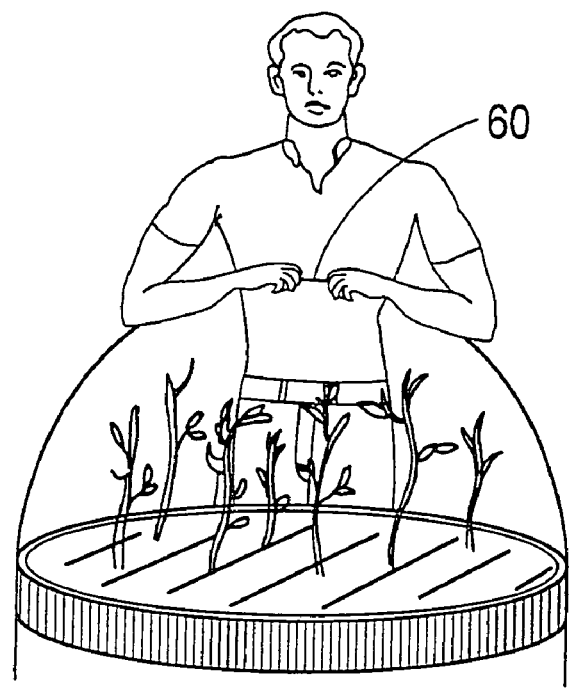
FIGS. 4a and 4b show object movement spatial volume management.
Figure 4B:
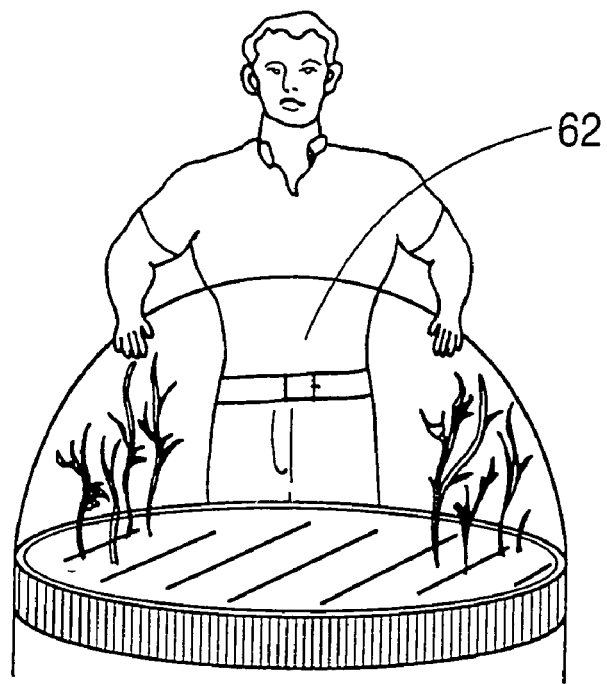

Another gesture command would cause objects being pushed to shrink in site to create more space. Another example, as shown in FIGS. 4a and 4b is a partition or scale of the 3D scene by using a "separation gesture" where the user specifies a start position 60 (FIG. 4a) with their hands together and then separates the hands to make space 62 (FIG. 4b). This has the effect of using virtual planes to part the 3D space, either translating the two halves or scaling the two halves (essentially scaling the scene to fit in the existing space). Other operations such as push out, delete, merge volumes, scale while preserving volume proportions, scale while not preserving volume proportions, "select" the volumes between the two planes defined by two hands, have a temporary volume defined by two planes positioned by the two hands (as described before), and where commands/operations are applied within this temporary volume or outside the temporary volume can be carried out with a plane tool used in volume management. Other gesture based actions are possible such as a "lasso" selection tool. Where a user gestures a shape on the display enclosure (e.g., an irregularly shaped oval outlined by contacting the display surface) and this shape is projected into the volume display as a "selection region" using a projection convention, such as orthogonal to a cube volumetric display surface.

These techniques use the 3D display map of the volumetric display to determine when one volume or tool encounters an object or another volume by comparing the assignment of display voxels to objects, volumes and tools. When a gesture causes the same voxels to be provisionally assigned to different objects, volumes, or tools, the system resolves the conflict by performing the appropriate function; such as moving a volume away from a plane being used to push aside objects and volumes.

Note that, in these operations, the system is performing a "pick detection". Depending on the type of input event (say mouse down), the window manager cycles through its parent windows passing along the input event and essentially asking if any window is interested. Since each window knows it's bounding box, it can determine if the event occurred in its 3D spatial volume. Ultimately, the system can determine if an event happened outside any volume window (e.g., it started on the "desktop"). The system can behave differently for events (e.g., perform some window management functions) that fall outside of VWs.

The present invention is typically embodied in a system, as depicted in FIG. 5, where physical interface elements 80, such as a rotary dome position encoder, infrared user position detectors, a keyboard, touch sensitive dome enclosure surface, mouse, beam pointer, beam pointer with thumbwheel, stylus and digitizer pad or stylus and stylus sensitive dome enclosure surface, stylus with pressure sensor, flock-of-birds, etc. are coupled to a computer 82, such as a server class machine. The computer 82 uses a graphical creation process, such as the animation package MAYA available from Alias|Wavefront, Inc., to create volume windows and three-dimensional (3D) scene elements within the windows. This process, using position inputs from the input configurations, also creates virtual interface elements, such as a virtual hand, a 3D point cursor, a 3D volume cursor, a pointing beam, a bead, etc. suitable for manipulating the volume windows. The display output, including the volume windows, scenes and interface elements, etc., is provided to a volumetric display apparatus configuration 84, such as one that will produce a 3D holographic display and discussed herein.

Figure 6:
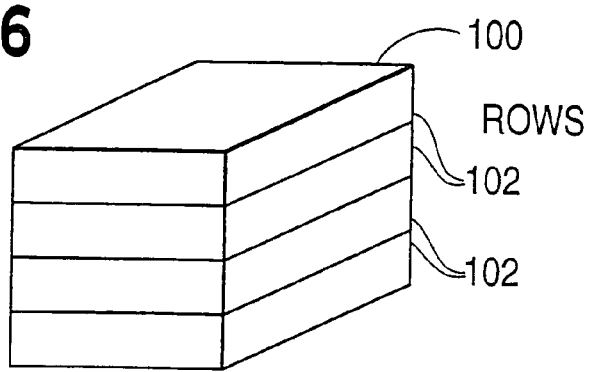
FIG. 6 shows row volume windows.
Figure 7:
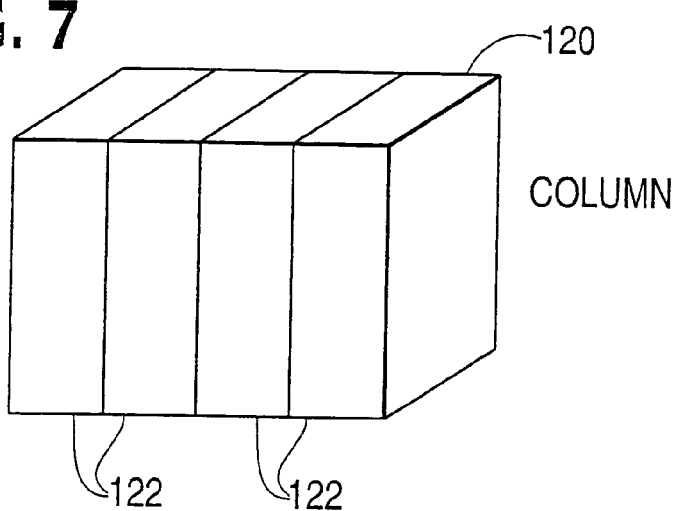
FIG. 7 shows column volume windows.
Figure 8:
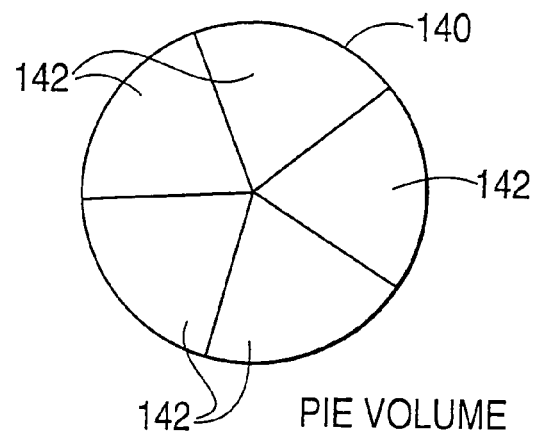
FIG. 8 depicts pie or wedge shaped volume windows.

A volumetric display space can be divided into a number of sub-volumes or volume windows in a number of different ways or with different organizations. FIG. 6 depicts a cubic volumetric display space 100 having a basic division into planar cubic type "row" windows 102 while FIG. 7 depicts division of a cubic display space 120 into planar "column" windows 122. FIG. 8 shows a dome or cylinder display space 140 divided into pie wedge volume windows 142. These sub-volumes can be created using the planar definition approach mentioned previously with respect to FIG. 2. A user could manually define the volumetric space and create all of these subvolumes. In this approach, the system senses the position and orientation of one or a pair of pointing devices which are used to define a plane within the volume creating two windows. The plane is then designated as a bounding plane between two volumes. However, in practice, this is preferably done by the system adhering to a particular space management policy selected by the user. The user selects an icon representing the type of volume, designates a 3D origin or a default origin, and the system draws the predefined volume at the origin. For a "new slice" pie volume policy for a pie as in FIG. 8, the system would have a new slice predefined and shrink the pre-existing slices by some percentage to make room, such that the resizing of the slices is done by the system. This shrinking would happen more in a "fully tiled" policy. Otherwise, when someone requests a new VW, it would overlap with existing VWs. In a free-for-all overlapping policy, the system would "crush" or deflate the volumes into a 2D representation or smaller 3D representation and push them to the edge of the volumetric display (or to some designated taskbar).

Figure 9A:
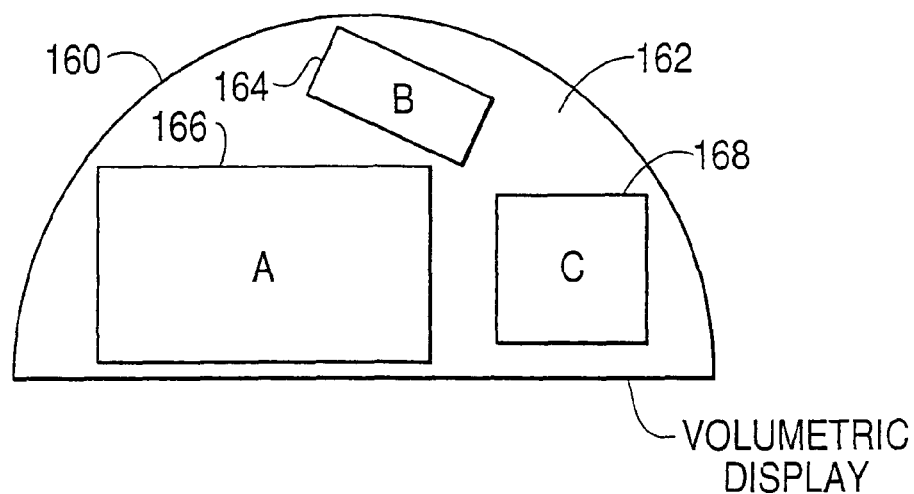
FIGS. 9a and 9b illustrate views of cubic volume windows.
Figure 9B:
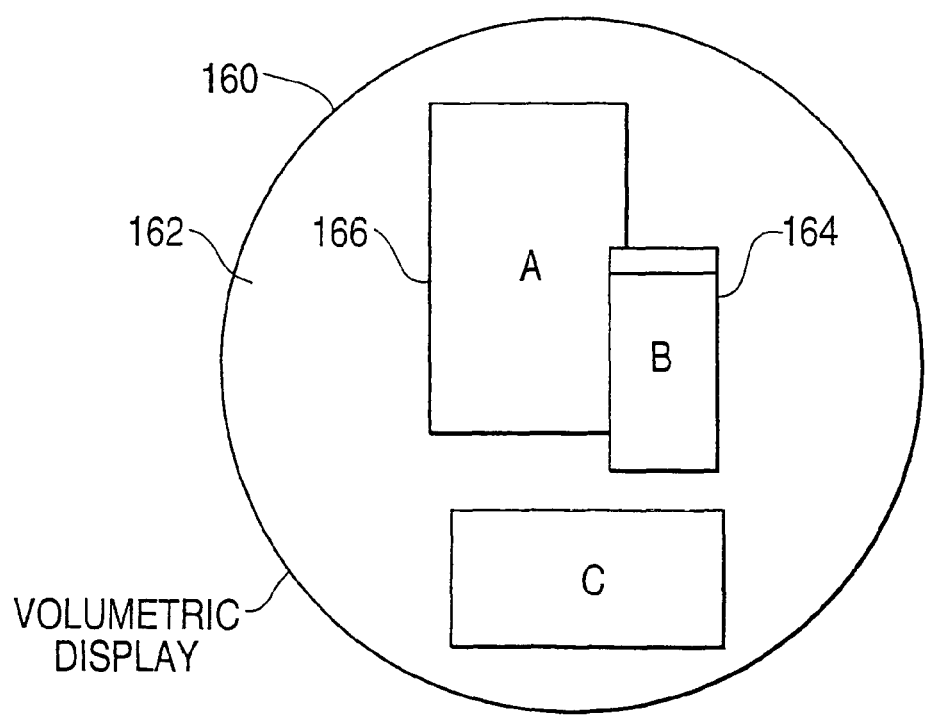

FIGS. 9a and 9b show a dome shaped volumetric display 160 including a volumetric display space 162 having three cubic shaped volume windows 164, 166 and 168. If the space 162 is considered to be a root volume window, the spaces 164, 166 and 168 are volume windows. These volume windows are created by the application used to view the data being selected (e.g., selecting a file and issuing the "open" command, causes the system to determine what application to use to display the data). A data file of the application has information such as preferred shape, size and position that is set as a default or that the application retained from the last time this VW was opened. Creating new volumes typically occurs from within the application. For the default shapes, the user also can specify the scale as well as the position of the new volume. By default, it is preferred that the new volumes be positioned in the center of the volume. The (0,0,0) coordinate origin will preferably be in the center of the base of the display. The particular placement of the origin is not as important as is the establishment of a standard.

Figure 10A:
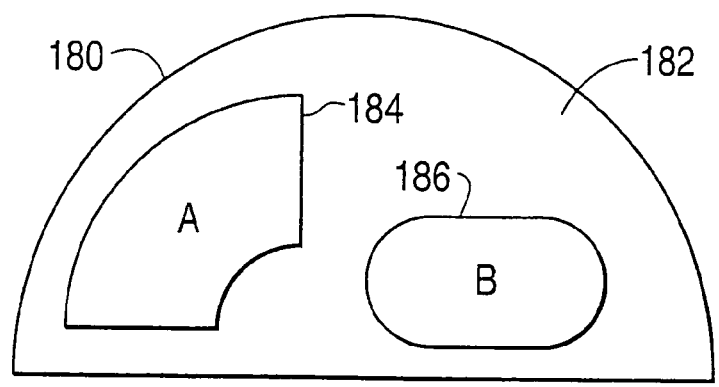
FIGS. 10a and 10b show arbitrary shaped windows.
Figure 10B:
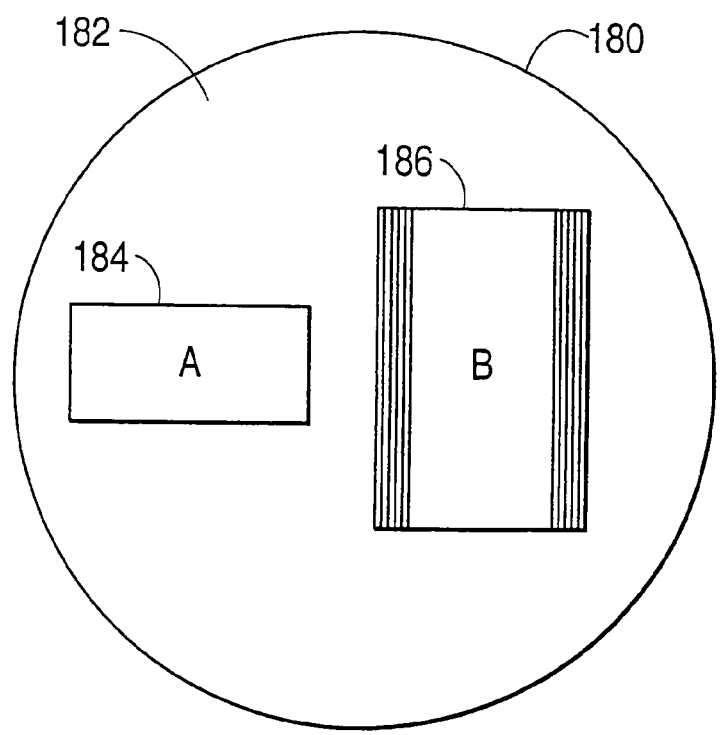

FIGS. 10a and 10b illustrate a dome shaped volumetric display 180 including a volumetric display space 182 including two volume windows, a curved-box 184, and an oval-tube 186. These shapes can be chosen by a user picking from a list of pre-defined volumes from within an application. Thus, the user just needs to specify the position and scale of the volumes. Simple volumes can be constructed using standard practices found in 3D graphics programs, such as Alias|Wavefront's MAYA program. Creating an arbitrary shape can be performed by using an extrude command in this type of tool where the user draws a 2D cross-section shape and then defines a second profile curve to "extrude" along. Also, an existing 3D object can be selected and a new volume space can be defined based on the shape of the selected object.

Figure 11A:
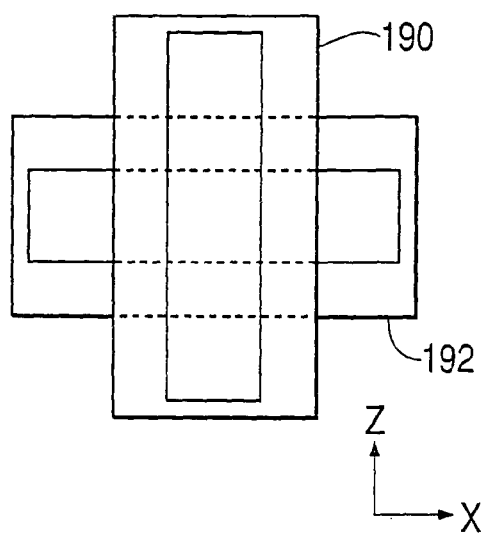
FIGS. 11a, 11b, 12a and 12b show different types of volume display strategies for volumes windows.
Figure 11B:
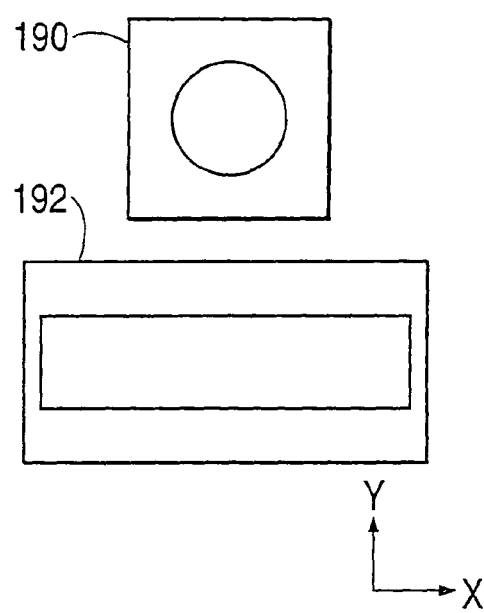
Figure 12A:
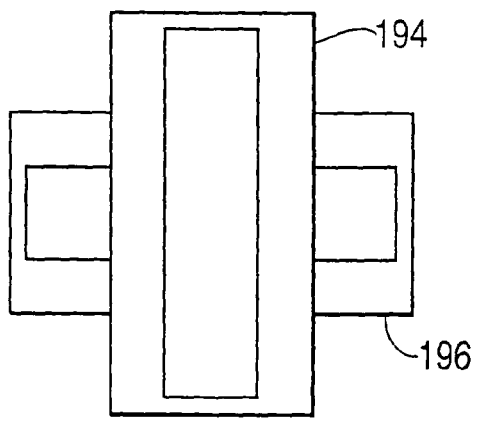
Figure 12B:
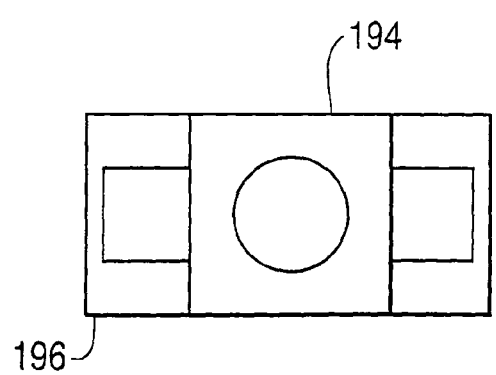

FIGS. 11a, 11b, 12a and 12b depict additional volumes managed by the present invention. In FIGS. 11a and 11b the volumes do not intersect and are in a "tiled" configuration and the management system preferably allows the volume 192 to be seen through the volume 190 when the user is viewing the display from above (FIG. 11a). With a tiled strategy a working window, if enlarged, would result in the shrinking of the displayed portion of an abutting volume. This is in contrast to the situation shown in FIGS. 12a and 12b where the volume windows overlap and (active/working) window 194 takes display precedence over volume window 196 and is the input focus.

The volumes discussed above all have height, width and depth. It is possible for a volume window to essentially have a minimal depth, such that it is one voxel deep and is a 2D window with 3D characteristics.

As in the 2D windows world, icons/controls can be designated for selection by the user for common operations. FIG. 13 illustrates a volume window 210, actually a visible bounding box of a volume window, having an attached volume activation region 212 that acts like the title bar at the top of a typical 2D window. The title bar will also have an optional text label (e.g., name of data file and/or application) and other graphic marks signifying status information and/or to identify the application running within the volume. The title or activation bar 212 is typically attached to the volume to which it is assigned and conforms to the shape of the volume. The title bar 212 signals the orientation of the volume and what side of the volume is the front. The title bar can be inside or outside the volume to which it is assigned. If inside, it can have the same appearing/disappearing operation as the "start" bar in a typical 2D windows system where the location of the cursor can cause the title bar to appear disappear. The title bar is a volume and preferably has a high priority for display such that it may only be clipped in limited circumstances. The title bar also preferably has a preferred front "face" of the data volume where it appears and the volume is assigned the highest precedence or priority in the display memory/data structure so that it is completely displayed. When a pointer selects the title bar 212, the volume 210 becomes the active working volume. Dragging the title bar will also perform a move volume window operation. Within the activation region 212 are four controls that could be considered among the typical controls for a volume window. These controls include a move volume window control 214, a maximize volume window control 266, a minimize volume window control 218 and a resize volume window control 220. These controls function in a manner similar to the controls in a 2D window display system.

The move volume control, when activated, allows the user to select the volume and move it to another location in a drag and drop type operation. In this operation, typically, a pointer device is used to select and activate the control 214 by, for example, having a beam, created responsive to the pointer device, intersect the control. A button on the pointer, when activated, causes the selection of the control intersected by the beam. Similar to the 2D operation, when the move control is activated, the volume activation region of a window intersected by the beam becomes the volume selected for moving when a pointer device button is depressed. Once the volume window is selected, it moves with the movement of the beam until the button is released, similar to the drag and drop of a 2D window. The depth of moving volume window along the beam as it is moved is typically controlled by another control device, such as a thumb wheel on the pointer device. In performing the move the position of the bounding box for the window is updated in the volume window data structure. Thus, the user can swing the beam to move the volume transversely and use the thumb wheel to move the window closer to or further away from the user. Dragging the title bar will also perform a move volume window operation. In this move operation a 3D volume is moved in three dimensions in accordance with a 3D input vector or two separate 2D input vectors.

A resize control allows the volume window to be resized. The size can be automatically changed through automatic functions similar to increments in a zoom operation or the user can use an input device to resize the window by dragging the sides of the volume window. A drag of a corner of a volume window causes the volume to be expand in 3D. When a window is being resized and a side encounters another window the resizing can be stopped with a warning being displayed to the user or the display space allocated to the abutting window can be clipped. The portions of the volume window data structure defining a size and a position of a bounding box are updated during resizing.

The maximize operation 216, expands the volume in the three-dimension until it "fills" the volumetric display. In cases where the display shape is different from the volume window shape, the expansion is according to a policy, such as center VW in the display space and expand until the VW contacts the outside edge of the display space. Of course the policy could only expand 2 or even 1 of the dimensions or the user could be allowed to designate dimensions to expand. During the maximize operation position and boundaries of the volume window bounding box are updated. The contents of the volume window are scaled in proportion to the change in volume of the volume window which occurs during the maximize operation.

In the minimize operation the system, substitutes a mini-3D icon for the VW and preferably places the icon at a designated position, such as the origin of the VW or on the bottom of the display space. An alternative is to display only the task bar at a preferred position. In the minimize operation the bitmap for the icon in the window data structure is obtained and placed in the display space as noted above.

The management of volume windows can be divided into a number of different tasks, such as initialization of a window, performing tasks within the window, etc.

Figure 14:
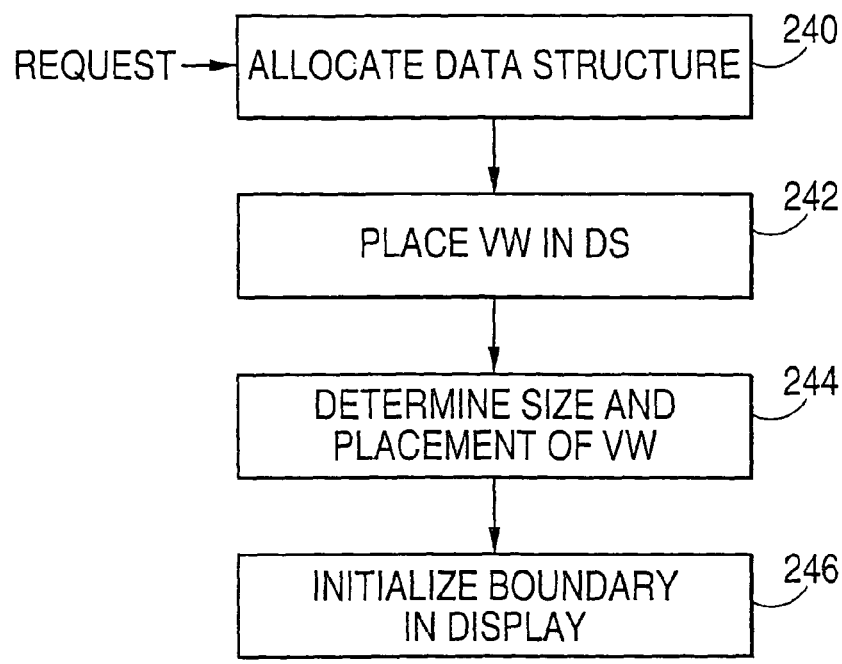
FIG. 14 depicts operations of a volume manager in initiating a volume window.

The initialization or open operations, as depicted in FIG. 14 include an application, such as the manager of a 3D drawing program requesting the allocation of one or more volumetric drawing windows. This is an application started within the volumetric display and it asks for display space. The request can include a preferred position or placement for the window within the volumetric display which can be associated with the current position of a cursor, a preferred size, etc. The volume manager allocates 240 a VW data structure (see FIG. 16) for each of the volumetric windows requested by the application. The volume manager then places 242 the volume window in the volume window data structure, links it to the root volume, sets a permission in the data structure indicating that the application can perform functions in the allocated window and informs the application of the location of the data structure. The manager then determines 244 the placement and size of the window responsive to default parameters and any currently active volumetric windows. For example, if the default or requested size would overwrite an existing volume, the volume being initiated can be scaled down or moved by the manager so that there is no overlap with an existing volume window. As in common overlapping 2D windowing systems, a new window request is always granted and placed on top of existing windows. The scaling of nearby windows occurs if the system is employing a tiling policy VW's and follows conventions as in 2D operations but in three dimensions. One approach is to push existing VWs to the outer perimeter of the volumetric display, reducing any empty space between VWs. This would grab as much free space as possible before having to scale existing VWs. The system then places 246 a visible boundary for the bounding box in the display around the volume determined by the manager to be allocated to the initiated volume window. When the bounding box has a predefined shape the bounding box can be drawn and highlighted by the manager or the request can be passed onto the application which can perform the operation if a VW has an arbitrary shape. Once the boundary is created, the application directs all application events, in this case drawing events, such as paint brush movement, to the volume window(s) allocated.

Figure 15:
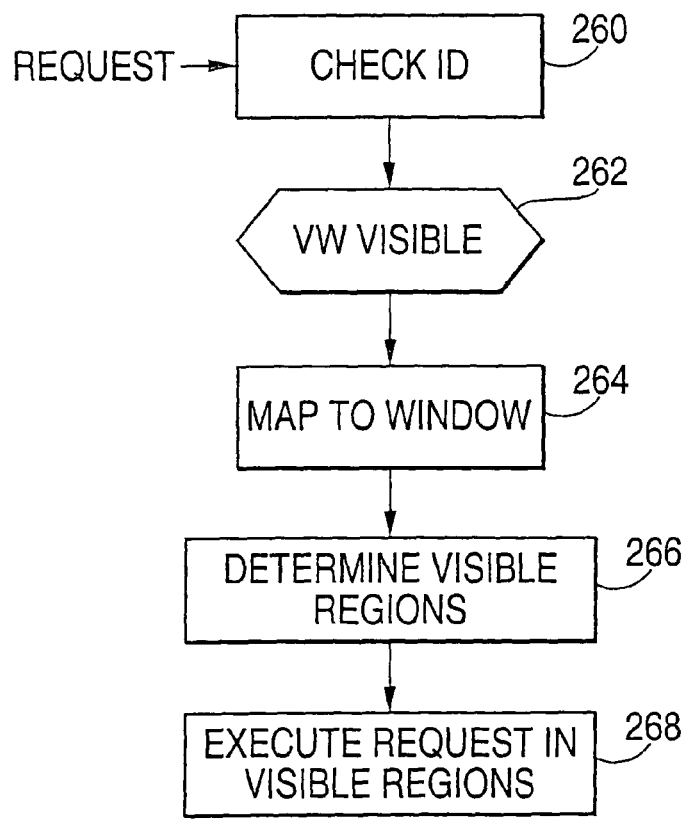
FIG. 15 shows operations of an application manager.

In order to perform application functions, such as drawing in a volume window, the application, such as a drawing application, sends a request, in this case a draw request, to a drawing manager. The request includes a volume window identifier (ID), a command or function to be performed, such as DrawLine, and a location where the command is to be performed. The drawing manager, as depicted in FIG. 15, checks 260 to see if the unique volume window ID of the request is valid and to see if the application is allowed to draw in the identified volume window by comparing the identification in the graphics port of the volume window data structure. The manager then checks 262 to see if any of the window is visible (that is, it has not been minimized) again by accessing the data structure. If no part of the window is visible, no action occurs. However, the volumetric window will have a flag (updateVRgn) set so when the VW becomes visible or is no longer being clipped, the region will be redrawn. Using the data structure of the window, the manager maps 264 the location associated with the request from the application coordinate space to device space taking into account the current position or location of the specified volume window (boundingBoxPositionVW and orientationVW). That is, the application location is mapped to a corresponding location in the window of the display. From the list of active windows, the manager then determines or computes 266 which regions of the specified window are visible. The draw request is then executed 268 only for valid visible regions of the specified volumetric window.

Figure 16:
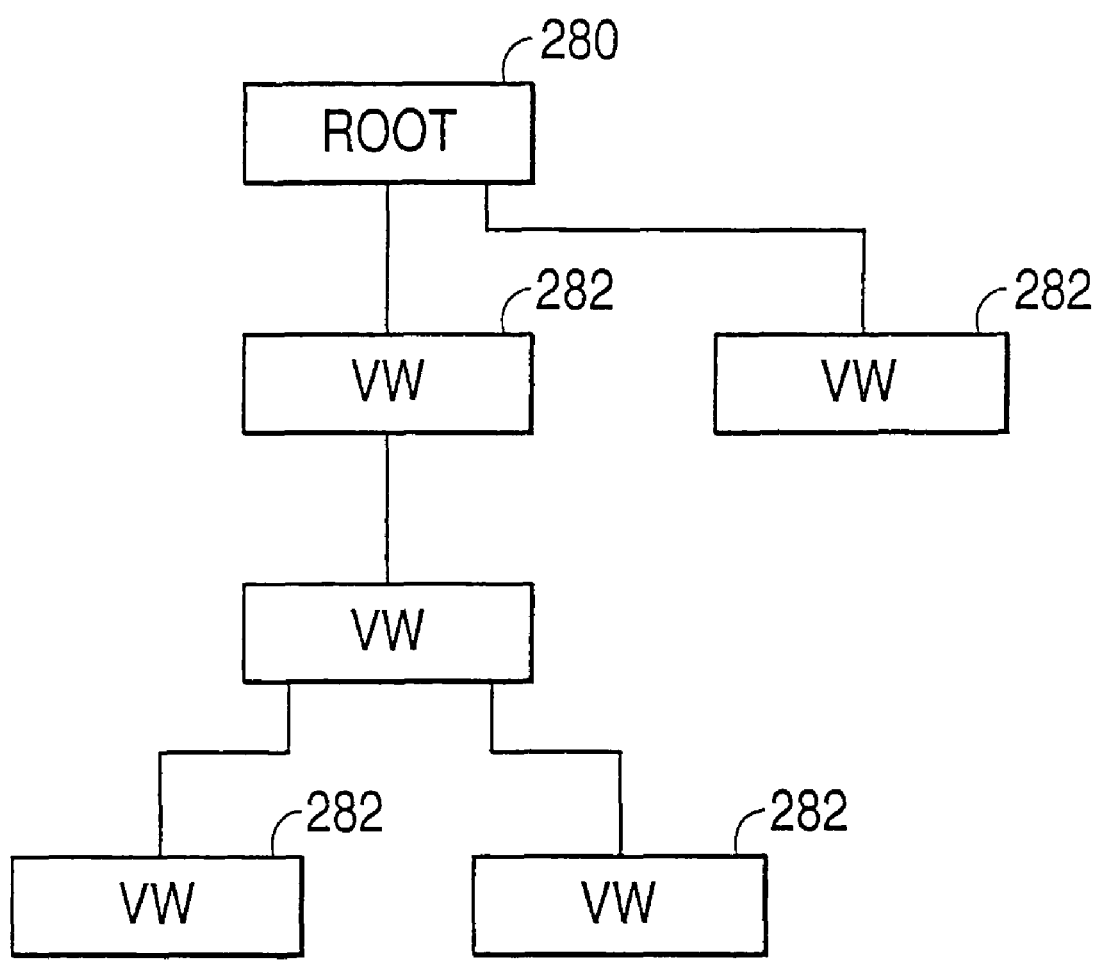
FIG. 16 depicts a data structure used in volume management.

The volume manager uses a data structure such as depicted in FIG. 16. This data structure is a list data structure having a root node 280 and can take the shape of a linear list or a tree of VW nodes 282 as shown as the example. The root node 280 includes the following fields.

Volume Manager Data Structure

```
Struct VM {
    List            VW;
    ShapeType       shape;
    Int             hardwareWidth;
    Int             hardwareHeight;
    Int             hardwareDepth;
}
Operations:
Initialize( )
Create VW( )
Name VW( )
ShowVW( )
HideVW( )
HiliteVW( )
BringToFront( )
SendBehind( )
MoveVW( )
ResizeVW( )
```

The List is a list of pointers to the volume windows (nodes) of the display. The shape type defines the particular type of displays, such as dome, cube, cylinder, etc. The shape has an associated width, height and depth dimensions. The operations are pointers to operations that can be performed or are valid in the volumetric display and include any parameters that may be set by default for the operation. The operations for move, maximize and minimize discussed previously would typically be included but are not shown.

Each of the volume windows includes the following fields. Volume Window.

```
Struct VW {
    VgraphicPort              vport;
    Boolean                   visibility;
    Boolean                   hilited;
    TitleBarStructure         titelbar;
    VolRgnHandle contentVRgn;
    VolRgnHandle updateVRgn;
    VolRgnHandle boundingBoxPositionVW;
    OrientationHandle         orientationVW;
    ShapeType                 shape;
    IconImage                 2Dicon;
    Handle                    nextVW;
    Handle                    parentVW;
}
```

The VgraphicPort defines the application graphics port in which the volume window is drawn. This structure defines the volume in which the drawing can occur, the volume window's visibility region, clipping region, etc. Fields for making the volume visible (hidden or visible) and highlighting the volumes are included. The TitleBarStructure contains information to position, display and handle the move, maximize, minimize, and resize volume window functionality. The "Front" of the VW is determined, in part, by the orientationVW information. The VolRgnHandle are structures that define a pointer to a volumetric region. Note that this region can be defined as an arbitrary shape. By default, the VolRgnHandle consists of a CUBIC shape with six values: bottomFrontX, bottomFrontY, bottomFrontZ and topBackX, topBackY, topBackZ. The contentVRgn defines the space the volume window owns, relative to the application. All of the region may or may not be visible within the volumetric display (depending on the position of the VW and other VWs). The updateVRgn specifies which portion of the entire contentVRgn which the application must refresh and redraw. While the VW can be any shape, a bounding box will be defined that minimally surrounds the shape. Thus, boundingBoxPositionVW specifies the absolute position of the VW relative to the (0, 0, 0) origin of the volumetric display. The orientation of the volumetric window is defined by the OrientationHandle which specifies the central axis or spine of the volume window as well as the "front" region of the volume window. The central axis, by default, is a vertical vector which matches the (0, 0, 0) coordinate axis of the volumetric display. ShapeType is a set of known volume window shapes (e.g., CUBIC, PIE, CYLINDER, EXTRUDED_SURFACE, ARBITRARY). 2Dicon is a 2D or 3D bitmap image used to represent the VW when it is minimized. nextVW points to the next VW in the WindowManager's VW list. ParentVW, by default is the RootVW. However, if subVW are defined, then the parentVW will not be the RootVW but instead the true owner of the subVW.

When the computer operating system receives an input event, the volume manager uses the input event and an assignment policy to determine which volume window receives the event. For example, one policy is to send all events to the application corresponding to the window that encloses the spatial location of the event or cursor. If more than one window encloses the event, a priority policy is used, such as visible volume window. For input events that do not have an inherent spatial position for example keyboard events, the events are sent to the window that currently has the designated input focus, such as the working or active window. When the cursor or input focus is not in a VW, the event is sent to the root.

Volume windows can be related hierarchically such that a window can have volume sub-windows. It is preferred that all sub-windows obey the operations of the parent in the hierarchy. For example, if a parent window is deleted all children of the parent are also deleted. If a parent gets moved all of the children are moved by the same amount and in the same direction. A SubVW does not necessarily move with the parentVW. However, if a parentVW is minimized or closed, the subVW does comply. A parent may or may not "clip" the display of its children against its own bounding box. That is, children may exist outside of the volume of the parent. A child preferably inherits properties or attributes of the parent volumetric window.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of managing a physical volumetric display having three physical dimensions, comprising:
    creating one or more physical sub-volumes within the physical volumetric display each having three physical dimensions and each occupying a physical volume space in the physical volumetric display;
    providing application data to windows corresponding to one or more applications assigned to each of the sub-volumes; and
    assigning GUI control operations based on user-made hand gestures directly defining a virtual plane as a volume between two hands in the physical volumetric display for the physical sub-volumes to the sub-volumes and applying an effect of the operations anywhere in an interior of the physical sub-volume to which the operations are directed.

2. A method as recited in claim 1, wherein the sub-volumes are delimited by visible boundaries.

3. A method as recited in claim 1, wherein the sub-volumes have a shape comprising one of cubic, cylindrical or pie wedges.

4. A method as recited in claim 1, wherein input events are assigned to one of the sub-volumes responsive to input focus.

5. A method as recited in claim 4, wherein input focus comprises the sub-volume enclosing the cursor for spatial input events and the active sub-volume for non spatial input events.

6. A method as recited in claim 1, wherein the sub-volumes have functions comprising one of open, close, resize, maximize, minimize, move, or hide.

7. A method as recited in claim 6, wherein the open function allocates a three-dimensional region within the display for an application having an origin and highlights a three-dimensional boundary of the region, displaying display outputs of the application in the region, and sending all the cursor events to the application when a cursor is within the region.

8. A method as recited in claim 6, wherein the minimize function substitutes a three-dimensional icon for a designated sub-volume and places icon at a designated position within the display.

9. A method as recited in claim 6, wherein the maximize function expands a designated sub-volume until the sub-volume contacts a boundary of the display and scales contents of the sub-volume in proportion to the change in volume.

10. A method as recited in claim 6, wherein the move function moves a three-dimensional sub-volume in accordance with a three-dimensional motion vector.

11. A method as recited in claim 6, wherein the resize function determines whether an active sub-volume encounters an inactive sub-volume in three dimensions.

12. A method as recited in claim 1, wherein application requests are mapped to corresponding sub-volumes responsive to the sub-volume assigned to the application.

13. A method as recited in claim 1, wherein an active sub-volume having a size can have the size changed and the method comprising resizing a sub-volume that abuts the active sub-volume responsive to the change in size of an active window.

14. A method as recited in claim 1, wherein the sub-volumes have a shape comprising irregular or spherical.

15. A method of managing a physical volumetric display having three physical dimensions, comprising:
creating sub-volumes within the physical volumetric display each having three physical dimensions and each occupying a volume space within a volumetric display;
associating a process with each of the sub-volumes; and
assigning GUI operations based on user-made hand gestures directly defining a virtual plane as a volume between two hands in the physical volumetric display for the physical sub-volumes to the sub-volumes and applying an effect of the operations anywhere in an interior of the physical sub-volume to which the operations are directed.

16. A non-transitory computer readable storage storing instructions when executed by a processor is used for controlling a computer by creating one or more sub-volumes having three physical dimensions and each occupying a volume space in a physical volumetric display having three physical dimensions, providing application data to the windows corresponding to one or more applications assigned to each of the windows, and assigning GUI operations based on user-made hand gestures directly defining a virtual plane as a volume between two hands in the physical volumetric display for the sub-volumes to the sub-volumes and applying the operations anywhere in an interior of the physical sub-volume to which the operations are directed.

17. An apparatus, comprising:
a volumetric display apparatus having a physical volumetric display having three physical dimensions;
an input system producing input events; and
a computer creating physical sub-volumes having three physical dimensions and each occupying a volume space within the display, assigning application data to the windows responsive to applications assigned to the windows, and assigning input events based on user-made hand gestures directly defining a virtual plane as a volume between two hands in the physical volumetric display to the sub-volumes responsive to input focus and applying the events anywhere in an interior of the physical sub-volume to which the events are directed.

18. A display, comprising:
a physical volumetric display space having three physical dimensions; and
a physical subvolume positioned in the display space and having a physical three-dimensional boundary, occupying a volume space and assigning GUI control operations based on user-made hand gestures directly defining a virtual plane as a volume between two hands in the physical volumetric display assigned to the subvolume and applying an effect anywhere in an interior of the physical volumetric display space to which the operations are directed.

19. A display as recited in claim 18, wherein the sub-volume window has a title bar indicating a sub-volume orientation and a front of the sub-volume.

20. A method of managing a physical volumetric display having three physical dimensions, comprising:
creating a physical sub-volume having three physical dimensions and occupying a volume space in the volumetric display;
displaying information in the volume window; and
assigning an input GUI control operation event to the sub-volume responsive to input focus and applying the event based on user-made hand gestures directly defining a virtual plane as a volume between two hands in the physical volumetric display anywhere in an interior of the physical sub-volume to which the event is assigned.

21. A display, comprising:
a volumetric display space having three physical dimensions; and
a physical sub-volume having three physical dimensions positioned in and occupying a volume space in the display space, displaying data and applying an input GUI control operation event based on user-made hand gestures directly defining a virtual plane as a volume between two hands in the physical volumetric display assigned to the sub-volume anywhere in the sub-volume to which the event is assigned.

22. A display, comprising:
a physical volumetric display space having three physical dimensions;
a volume menu bar having three physical dimensions positioned in and occupying a volume space in the display space and displaying menu items; and
a physical sub-volume associated with the menu bar and applying an input event based on user-made hand gestures directly defining a virtual plane as a volume between two hands in the physical volumetric display of one of the menu items limited anywhere in the sub-volume.

23. A display, comprising:
a physical volumetric display space having three physical dimensions;
a volume icon having three physical dimensions positioned in and occupying a volume space in the display space and initiating a function when activated; and
a physical sub-volume associated with the icon and applying an input event based on user-made hand gestures directly defining a virtual plane as a volume between two hands in the physical volumetric display of the icon anywhere in the sub-volume.

24. A method of managing a physical volumetric display having three physical dimensions, comprising:
creating a sub-volume having three physical dimensions occupying a volume space in the volumetric display; and
providing application data to a window and where display elements activated do not all reside on a single plane; and assigning an input event to the sub-volume responsive to input focus and applying the event based on user-made hand gestures directly defining a virtual plane as a volume between two hands in the physical volumetric display anywhere in the sub-volume to which the event is assigned.

25. A method of managing a volumetric display having three physical dimensions, comprising:
  creating a sub-volume having three physical dimensions; and
  assigning an input GUI control operation event to the sub-volume responsive to input focus and applying an effect of the event based on user-made hand gestures directly defining a virtual plane as a volume between two hands in the physical volumetric display anywhere in an interior of the sub-volume to which the event is assigned.

26. A method of managing a physical volumetric display having three physical dimensions, comprising:
  creating one or more physical sub-volumes within the physical volumetric display each having three physical dimensions and each occupying a physical volume space in the physical volumetric display;
  providing application data to windows corresponding to one or more applications assigned to each of the sub-volumes; and
  assigning GUI drawing control operations for the physical sub-volumes to the sub-volumes and applying a drawing effect of the operations based on user-made hand gestures directly defining a virtual plane as a volume between two hands in the physical volumetric display anywhere in an interior of the physical sub-volume to which the operation is directed.

27. A method of managing a volumetric display having three physical dimensions, comprising:
  creating a sub-volume having three physical dimensions; and
  assigning a drawing input GUI control operation event to the sub-volume responsive to input focus and applying an effect of the event based on user-made hand gestures directly defining a virtual plane as a volume between two hands in the physical volumetric display anywhere in an interior of the sub-volume to which the event is assigned.

* * * * *